United States Patent
Wang et al.

(10) Patent No.: US 12,422,581 B2
(45) Date of Patent: Sep. 23, 2025

(54) SYSTEM AND METHOD FOR PREDICTION OF RESERVOIR PARAMETERS WITH UNCERTAINTY QUANTIFICATION

(71) Applicant: Chevron U.S.A. Inc., San Ramon, CA (US)

(72) Inventors: Ke Wang, Sugar Land, TX (US); Jinsong Chen, Fulshear, TX (US); Yijie Zhou, Richmond, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 241 days.

(21) Appl. No.: 18/069,865

(22) Filed: Dec. 21, 2022

(65) Prior Publication Data

US 2024/0210584 A1     Jun. 27, 2024

(51) Int. Cl.
*G01V 1/30*     (2006.01)
*G01V 1/28*     (2006.01)
*G01V 1/34*     (2006.01)
*G06N 3/091*     (2023.01)

(52) U.S. Cl.
CPC .............. *G01V 1/30* (2013.01); *G01V 1/282* (2013.01); *G01V 1/345* (2013.01); *G06N 3/091* (2023.01)

(58) Field of Classification Search
USPC .......................................................... 702/14
See application file for complete search history.

(56) References Cited

U.S. PATENT DOCUMENTS

| | | |
|---|---|---|
| 11,409,013 B2 | 8/2022 | Wang et al. |
| 2019/0064389 A1* | 2/2019 | Denli ................. G06N 3/08 |
| 2020/0217978 A1* | 7/2020 | Chen ................. G06N 7/01 |
| 2021/0049485 A1* | 2/2021 | Bosch Blumenfeld .. G06N 3/08 |
| 2023/0289499 A1* | 9/2023 | Colombo ............. G01V 20/00 |

OTHER PUBLICATIONS

Christophe Andrieu et al., "An Introduction to MCMC for Machine Learning," Machine Learning, 50, 5-43, 2003, Kluwer Academic Publishers. Manufactured in The Netherlands.
Jinsong Chen et al., "Joint inversion of marine seismic AVA and CSEM data using statistical rock-physics models and Markov random fields," SEG Houston 2009 International Exposition and Annual Meeting, pp. 714-718.
Ke Wang et al., "End-to-End Deep Neural Network for Seismic Inversion," 2019 SEG, SEG International Exposition and 89th Annual Meeting, pp. 4982-4986.

* cited by examiner

*Primary Examiner* — Paul D Lee
(74) *Attorney, Agent, or Firm* — Marie L. Clapp

(57) ABSTRACT

A method is described for seismic inversion with uncertainty quantification including performing low frequency Markov Chain Monte Carlo (MCMC) processes on rock physics models to generate low frequency models (LFMs) of rock properties and training a deep neural network using the low frequency models and synthetic seismograms to generate a trained neural network. Given a seismic dataset, the trained neural network can generate a high frequency rock property model and then broad-band MCMC processes can be performed on the high frequency rock property model for uncertainty quantification. The method is executed by a computer system.

12 Claims, 7 Drawing Sheets

SYSTEM AND METHOD FOR PREDICTION OF RESERVOIR PARAMETERS WITH UNCERTAINTY QUANTIFICATION

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for predicting reservoir parameters with uncertainty quantification. In particular, the techniques predict reservoir parameters by coupling stochastic inversion with machine learning.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. Seismic acquisition over subsurface structure generally produces time-domain data, which is then migrated to time or depth image data. The time or depth image data will include an angle or offset axis containing information about the seismic amplitude behavior as it varies with reflection angle or offset. The migration process necessarily involves certain assumptions regarding the propagation velocity of elastic waves through the subsurface materials and structures. Moreover, there is generally some degree of anisotropy in geological formations. That is, while it may be possible to determine vertical velocities using well data, the velocities estimated using multi-offset (or angle) seismic techniques will necessarily be somewhat different from measured vertical velocities. Finally, because assumptions, based on measurement or estimation, regarding both velocities and degrees of anisotropy may be incorrect, there is some inherent uncertainty in the resulting image, both in the depth of imaged events and in the structural interpretation of the events.

Models of the subsurface obtained from geophysical measurements are inherently non-unique. Geophysical measurements are finite in resolution and relate to many orders of magnitude of scale. Uncertainty in the measurements results from a variety of sources, including signal-to-noise ratio, data acquisition parameter selection, processing algorithms, or the above-mentioned velocity and anisotropy parameter selection. It is therefore important to understand the degree of that uncertainty when evaluating model results. That is, it is important to quantitatively understand to what degree the models are sensitive to a given change or group of changes in the assumptions regarding velocities, anisotropy or the other factors impacting uncertainty. An understanding of the uncertainty and the range of possible characterizations allows interpreters of the data to make business decisions regarding reserve estimation, well placement and count, development scenarios, secondary recovery strategies and other factors that ultimately impact recovery and project economics.

There exists a need for improved seismic inversion that also provides information on the level of inherent uncertainty.

SUMMARY

In accordance with some embodiments, a method of seismic inversion with uncertainty quantification including receiving well logs and seismic angle stacks representative of a subsurface volume of interest; deriving rock physics models from the well logs and the seismic angle stacks; performing low frequency Markov Chain Monte Carlo (MCMC) processes on the rock physics models to generate low frequency models (LFMs) of rock properties; and training a deep neural network using the LFMs, the rock physics models, and the seismic angle stacks as training pairs of {log properties, seismic data} to generate a trained neural network is disclosed. The method may also provide a seismic dataset to the trained neural network to generate a high frequency rock property model and perform broadband MCMC processes on the high frequency rock property model to generate an ensemble of high frequency realizations of rock properties. The method may quantify uncertainty in the ensemble of high frequency realizations of rock properties.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
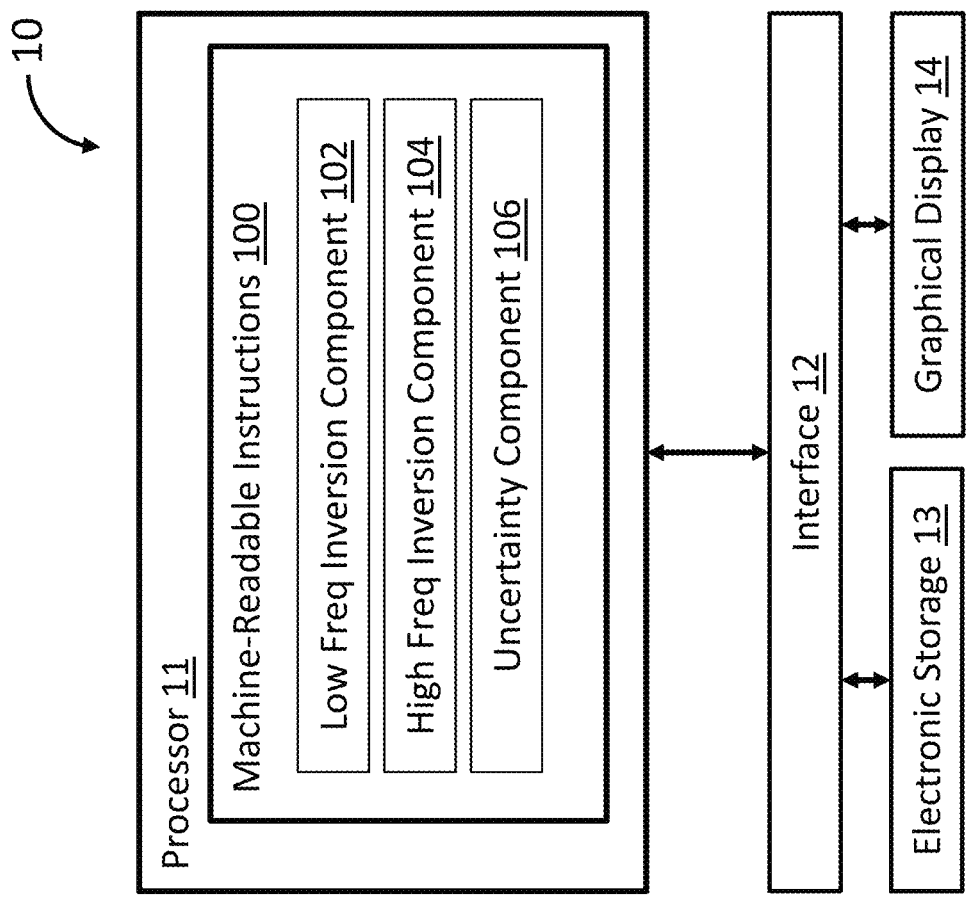
FIG. 1 illustrates an example system for seismic inversion with uncertainty quantification.

Described below are methods, systems, and computer readable storage media that provide a manner of efficient high-resolution seismic inversion with uncertainty quantification. The embodiments are designed to provide a manner of seismic inversion that does not require a user-specified low frequency rock model as input.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The methods and systems of the present disclosure may, in part, use one or more models that are machine-learning algorithms. These models may be supervised or unsupervised. Supervised learning algorithms are trained using labeled data (i.e., training data) which consist of input and output pairs. By way of example and not limitation, supervised learning algorithms may include classification and/or regression algorithms such as neural networks, generative adversarial networks, linear regression, etc. Unsupervised learning algorithms are trained using unlabeled data, meaning that training data pairs are not needed. By way of example and not limitation, unsupervised learning algorithms may include clustering and/or association algorithms such as k-means clustering, principal component analysis, singular value decomposition, etc. Although the present disclosure may name specific models, those of skill in the art will appreciate that any model that may accomplish the goal may be used.

Seismic inversion requires low frequency rock models (LFM), which are models of rock properties, to fill out the low frequency gap left by seismic data. Simple interpolation of log data across wells is severely limited by the availability of wells and it often fails when the earth presents high heterogeneity in the studied area. Stochastic Inversion based on Markov Chain Monte Carlo (MCMC) represents the state of the art in rock-property-estimation-from-seismic work and does not require a LFM to start with. MCMC can randomly sample elastic properties from the defined joint posterior distribution and provides associated uncertainty quantifications. However, MCMC is computationally expensive when applied to 3D seismic data. Generating high resolution inversion products with uncertainty quantification for large-size inverse problems from MCMC processes can be extremely slow because the size of searching space increases exponentially with the number of unknown parameters. We need an efficient seismic inversion method that generates high resolution products while keeping the two main advantages provided by MCMC: 1) not requiring a user-specified LFM and 2) uncertainty quantification of the output.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a graphical display 14, and/or other components. Processor 11 performs a method that leverages MCMC and Deep Neural Network (DNN) in machine learning for efficient high-resolution seismic inversion with uncertainty quantification.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to rock models, seismic data, and/or other information. The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

The graphical display 14 may refer to an electronic device that provides visual presentation of information. The graphical display 14 may include a color display and/or a non-color display. The graphical display 14 may be configured to visually present information. The graphical display 14 may present information using/within one or more graphical user interfaces. For example, the graphical display 14 may present information relating to the seismic inversion results, uncertainty quantification, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate seismic inversion with uncertainty quantification. The machine-readable instructions 100 may include one or more computer program components. The machine-readable instructions 100 may include a low frequency inversion component 102, a high frequency inversion component 104, an uncertainty component 106, and/or other computer program components.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

Referring again to machine-readable instructions 100, the low frequency component 102 may be configured to generate a low frequency rock model. This may be done by running low frequency (e.g., <15 Hz) MCMC processes on input rock physics models derived from logs and seismic angle stacks. No specific low frequency rock model (LFM) is required in this step. This step significantly reduces computing loads by limiting MCMC to low frequency models only because of the reduction of inversion model space.

The high frequency inversion component 104 may be configured to train a Deep Neural Network (DNN) on seismic angle stacks, rock physics models, and LFM's from the previous step. LFM is required as input for both training and inference of the DNN. This step generates high-resolution rock property estimation with minimal computing time, which is mainly for the training stage and is fixed regardless of the size of 3D data volume. This is a big cost saving compared to MCMC. It should be noted that final high-resolution results heavily depend on LFM input. Given the reliable LFMs estimated by MCMC by low frequency inversion component 102, the DNN is very effective at recovering high frequency features that are learned from logs and seismic data. The high frequency inversion component 104 creates an ensemble of high-resolution predictions by starting from the high frequency models from the DNN.

The uncertainty inversion component 106 may be configured to generate MCMC samples using the high-resolution predictions from high frequency inversion component 104 to explore the posterior distribution around the predicted parameters. Starting from locations close to the maximum likelihood estimation makes the process much more efficient than traditional MCMC. Meanwhile, LFMs as MCMC samples from low frequency component 102 can also be used for assessing multimodal distributions in this component if they occur.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

Figure 2:
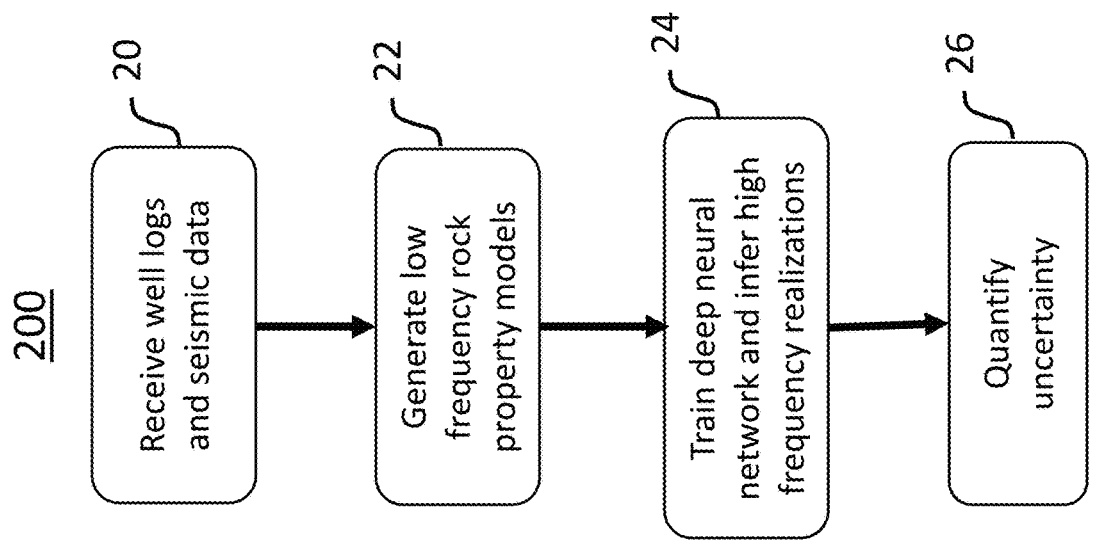
FIG. 2 illustrates an example method for seismic inversion with uncertainty quantification.

FIG. 2 illustrates an example process 200 for seismic inversion with uncertainty quantification. At step 20, the process receives well logs and seismic data. For example, the well logs may include acoustic impedance, density, and the p-wave velocity ($V_P$)-shear-wave ($V_S$) ratio $V_P/V_S$. The seismic data may consist of seismic angle stacks, which can be near/middle/far or any angle range that is adequate for deriving rock property variation from seismic data. These maybe used to derive rock physics models. This process involves analysis of the log data and seismic data to estimate a statistical model that describes the distribution of interest rock properties of interest. Therefore, we can draw samples from the estimated distribution to generate synthetic rock samples to mimic the subsurface property statistically.

At step 22, process 200 generates low frequency rock property models (LFMs) based on rock physics models derived from the well logs and seismic angle stacks. This may be done by running low frequency (e.g., <15 Hz) Markov Chain Monte Carlo (MCMC) stochastic inversion. Using the low frequencies means that the inversion is done as a global search in a reduced model space, reducing the computational cost significantly when compared to MCMC inversion for full bandwidth seismic data. This coarse-scale stochastic inversion using low frequency seismic data produces a robust estimation of a low frequency 3D model.

Figure 3:
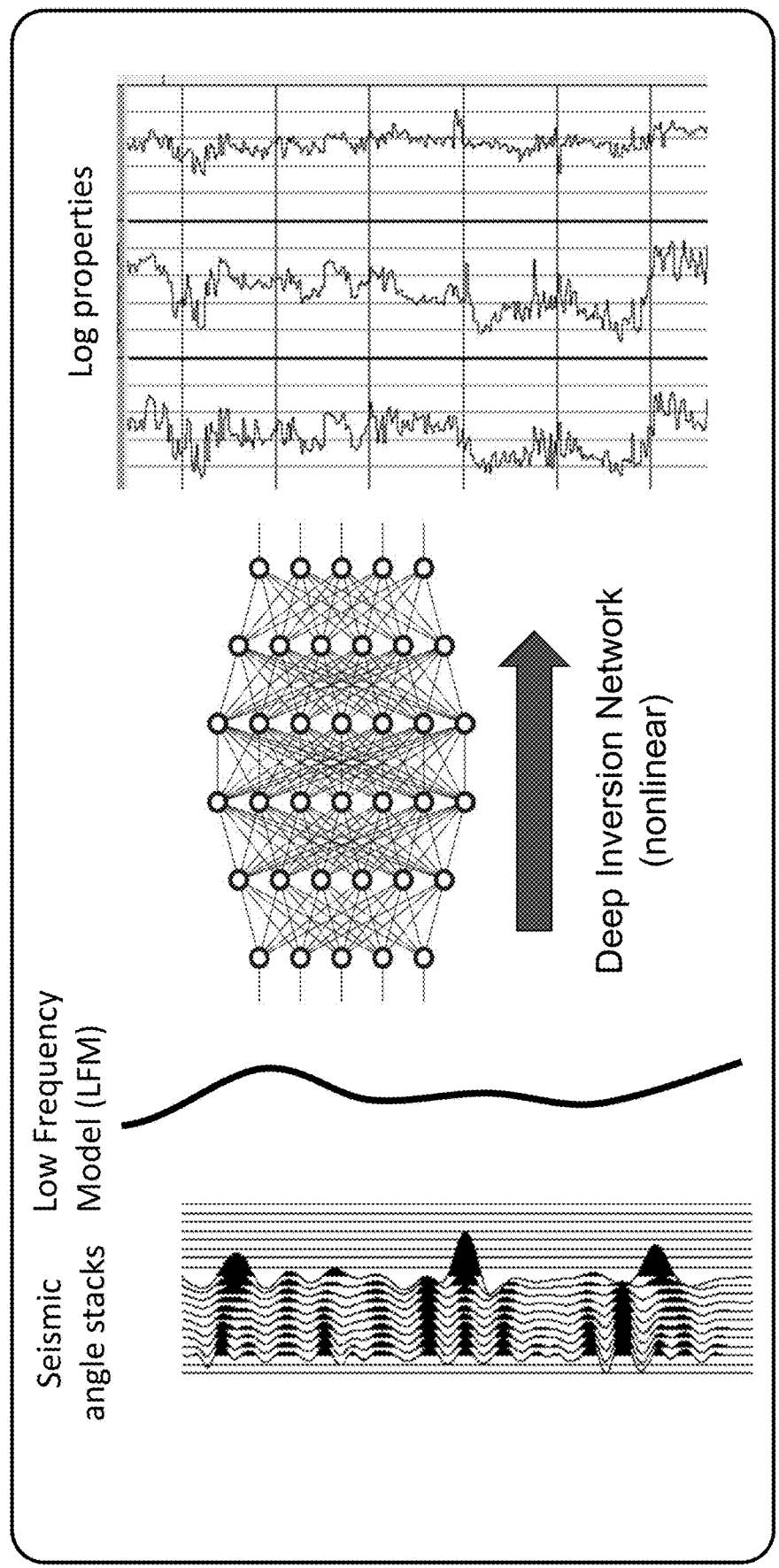
FIG. 3 illustrates a step for seismic inversion with uncertainty quantification.
Figure 4:
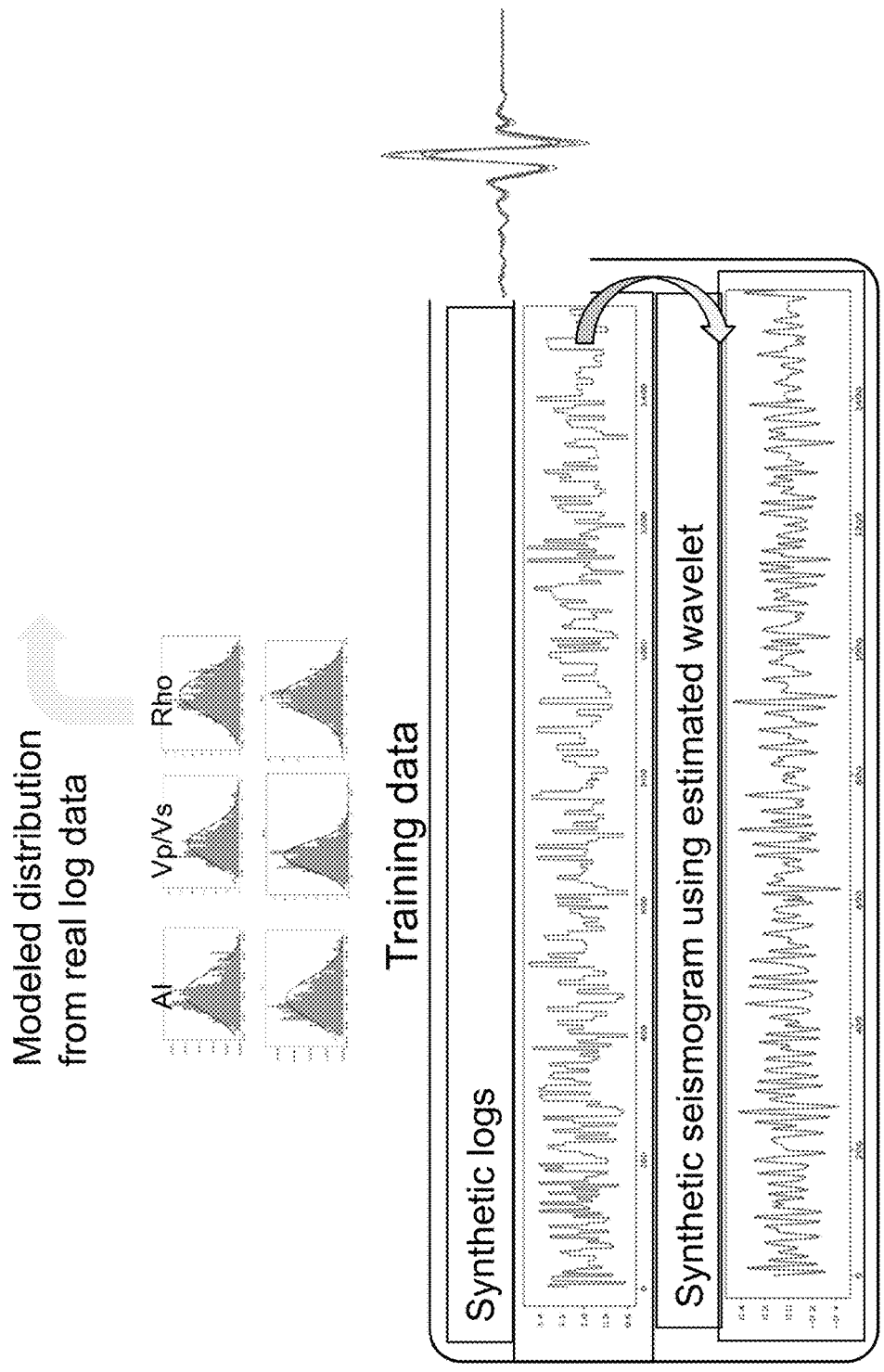
FIG. 4 illustrates a step for seismic inversion with uncertainty quantification.

At step 24, the LFMs from step 22 are used to train a deep neural network (DNN) on seismic angle stacks and rock physics models from the previous step. This is illustrated in FIG. 3 which shows the training pairs of the seismic angle stacks and low frequency model from step 22 and the log properties from well logs and/or rock physics models, along with the architecture of the DNN. FIG. 4 illustrates how synthetic training pairs are generated. First, synthetic logs are generated from the statistical distributions of rock physics model. Secondly, synthetic seismograms are generated using angle-dependent wavelets and reflectivity derived from the synthetic logs. As a result, each synthetic log suit will be paired with a synthetic seismic angle gather, called a training pair. Various Deep Neural Network architectures and training strategy can be deployed for this purpose, as long as they take seismic and LFMs in proper format and generate good approximations of log properties for the training pairs. The trained DNN is then used to infer a high frequency solution of the rock properties for a seismic dataset. This is done by using a real seismic data as input to the DNN and the output will be inference of rock properties, e.g., acoustic impedance, P-S velocity ratio, density and other reservoir properties, from the input seismic data. As the synthetic training pairs contains both low and high frequency information, this step generates a full bandwidth model of the Earth's subsurface. Overall, the training process is a physics-based training process using angle-dependent seismic wavelet estimation and synthetic logs generated from rock physics modeling. Step 22 and step 24 of process 200 provide a significant reduction of workflow complexity and computational expense while allowing high-resolution features to be learned from the training data.

Figure 5:
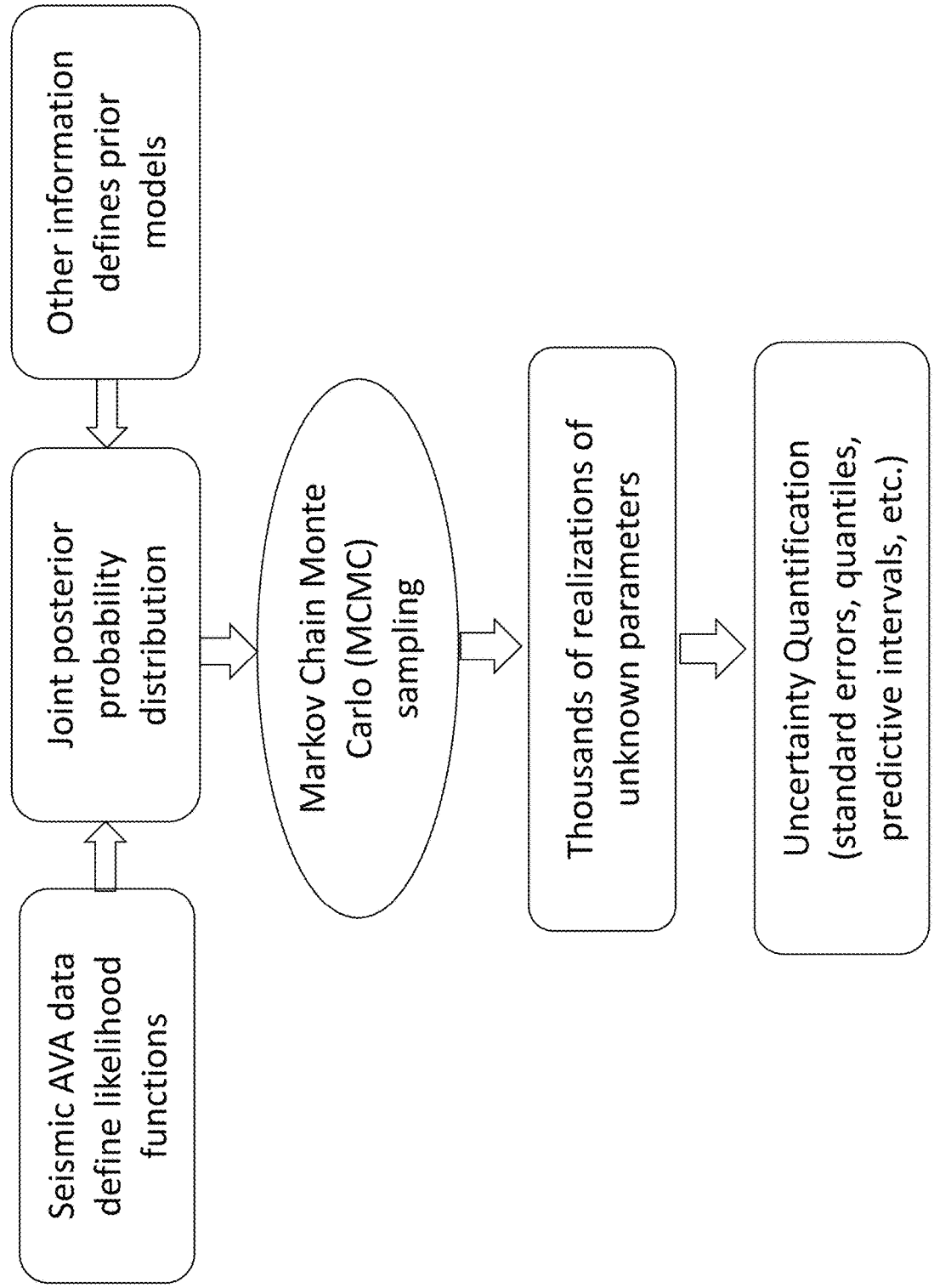
FIG. 5 illustrates a step for seismic inversion with uncertainty quantification.

At step 26, the process 200 quantifies uncertainty in the inversion. This is performed as another MCMC stochastic inversion but this time it is a fine-scale stochastic inversion using full band (all frequencies) seismic data. This MCMC stochastic inversion mainly makes perturbations around the high frequency model from step 24. It is a forward validation of the DNN result. The multiple perturbations provide multiple high-frequency realizations which are then used to quantify the uncertainty. The process of uncertainty quantification is shown in FIG. 5.

Figure 6:
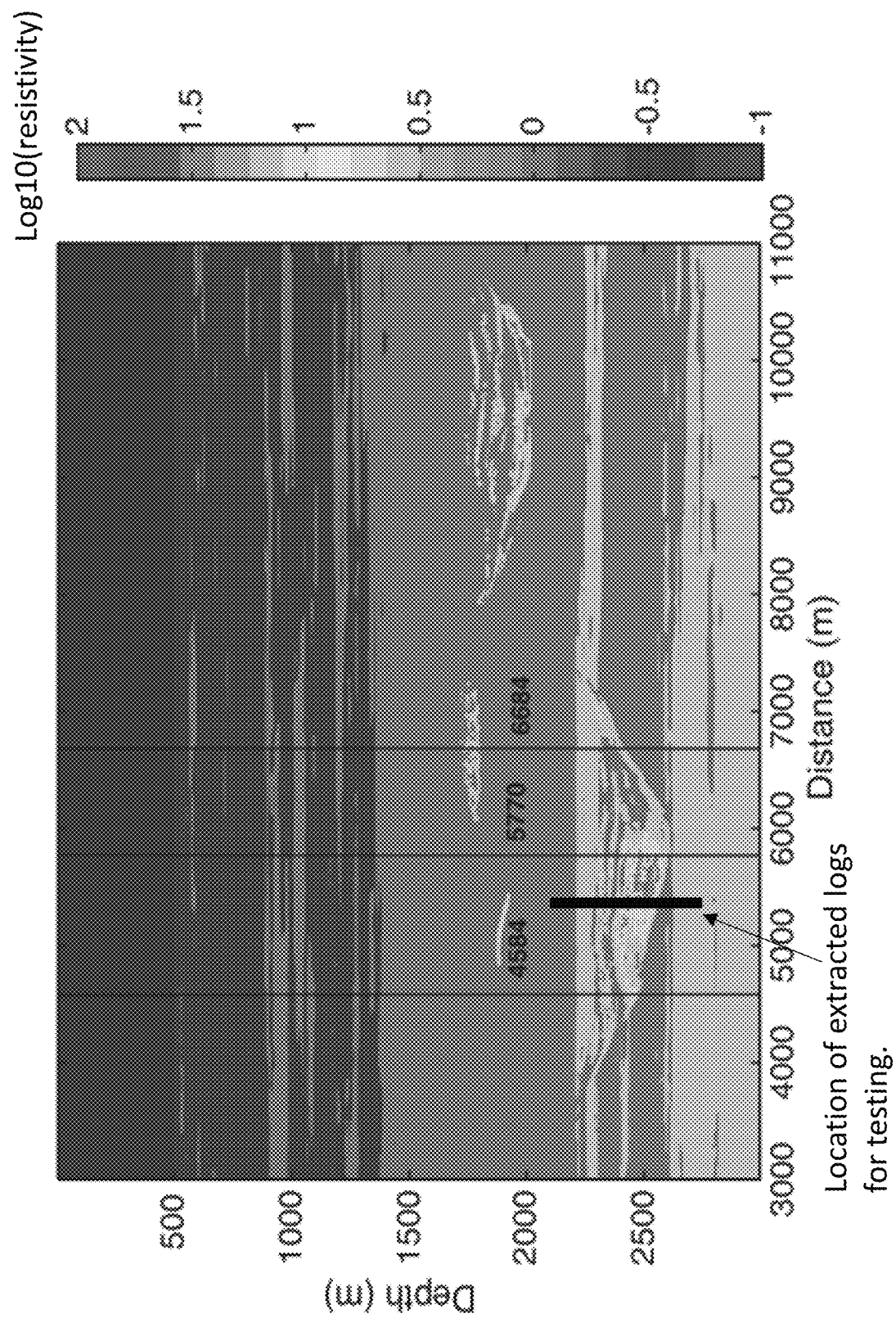
FIG. 6 is an example synthetic model.
Figure 7:
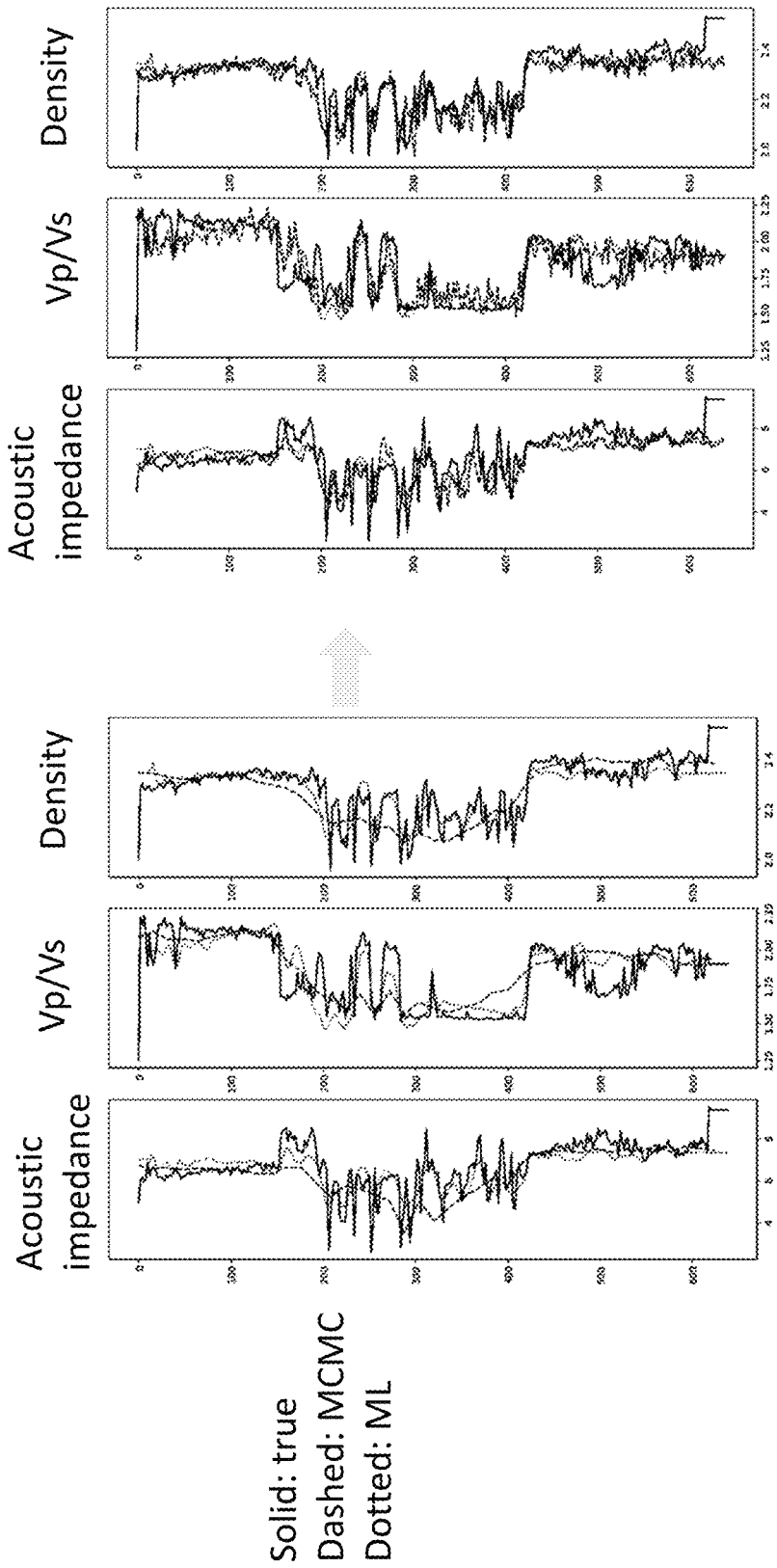
FIG. 7 demonstrates results of an embodiment of the present invention and compares them with results of a conventional method.

FIG. 6 is a synthetic reservoir model which, along with synthetic seismic data generated through seismic modeling, was run through process 200. The thick black line segment indicates the location where the logs shown in FIG. 7 were extracted to compare the result from a conventional MCMC process against the result of the new ML process disclosed herein, and against the true model. Since ML prediction from step 24 provides a starting solution in the high probability region to initiate MCMC process, Markov chain can reach the stationary state with significantly faster speed. For this example, the ML process is able to generate a result close to the true model after 500 iterations, while the conventional MCMC method required over 6000 iterations—the present invention is approximately a 10× speedup. The posterior distribution and associated related uncertainty quantification such as standard deviation, P10/P90 percentile can be derived from samples collected after Markov chain converges.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for efficient seismic inversion that does not require a user-specified low frequency model (LFM) as input, comprising:
   a. receiving, at one or more computer processors, well logs and seismic angle stacks representative of a subsurface volume of interest;
   b. deriving, via the one or more computer processors, rock physics models from the well logs and the seismic angle stacks;
   c. performing, via the one or more computer processors, low frequency Markov Chain Monte Carlo (MCMC) processes on the rock physics models to generate low frequency models (LFMs) of rock properties, wherein the low frequency models (LFMs) are lower than 15 Hz;
   d. training a deep neural network using the LFMs, the rock physics models, and the seismic angle stacks as training pairs of {log properties, seismic data} to generate a trained neural network;
   e. providing a seismic dataset to the trained neural network to generate a high frequency rock property model;
   f. performing broad-band MCMC processes on the high frequency rock property model to generate an ensemble of high frequency realizations of rock properties; and
   g. using the ensemble of high frequency realizations of rock properties to identify hydrocarbon deposits and recover hydrocarbons.

2. The method of claim 1 further comprising quantifying uncertainty in the ensemble of high frequency realizations of rock properties.

3. The method of claim 2 further comprising generating a graphical representation of the uncertainty and displaying the graphical representation on a graphical display.

4. The method of claim 1 further comprising generating a graphical representation of at least one of the ensemble of high frequency realizations of rock properties and displaying the graphical representation on a graphical display.

5. A computer system for efficient seismic inversion that does not require a user-specified low frequency model (LFM) as input, comprising:
   one or more processors;
   memory; and
   one or more programs, wherein the one or more programs are stored in the memory and configured to be executed by the one or more processors, the one or more programs including instructions that when executed by the one or more processors cause the system to:

a. receive, at the one or more processors, well logs and seismic angle stacks representative of a subsurface volume of interest;
b. derive, via the one or more processors, rock physics models from the well logs and the seismic angle stacks;
c. perform, via the one or more processors, low frequency Markov Chain Monte Carlo (MCMC) processes on the rock physics models to generate low frequency models (LFMs) of rock properties;
d. train a deep neural network using the LFMs, the rock physics models, and the seismic angle stacks as training pairs of {log properties, seismic data} to generate a trained neural network;
e. provide a seismic dataset to the trained neural network to generate a high frequency rock property model;
f. perform broad-band MCMC processes on the high frequency rock property model to generate an ensemble of high frequency realizations of rock properties; and
g. use the ensemble of high frequency realizations of rock properties to identify hydrocarbon deposits nd recover hydrocarbons.

6. The system of claim 5 further comprising instructions that when executed by the one or more processors cause the system to quantify uncertainty in the ensemble of high frequency realizations of rock properties.

7. The system of claim 6 further comprising instructions that when executed by the one or more processors cause the system to generate a graphical representation of the uncertainty and displaying the graphical representation on a graphical display.

8. The system of claim 5 further comprising instructions that when executed by the one or more processors cause the system to generate a graphical representation of at least one of the ensemble of high frequency realizations of rock properties and display the graphical representation on a graphical display.

9. A non-transitory computer readable storage medium storing one or more programs, the one or more programs comprising instructions for efficient seismic inversion that does not require a user-specified low frequency model (LFM) as input, which when executed by an electronic device with one or more processors and memory, cause the device to:
a. receive, at the one or more processors, well logs and seismic angle stacks representative of a subsurface volume of interest;
b. derive, via the one or more processors, rock physics models from the well logs and the seismic angle stacks;
c. perform, via the one or more processors, low frequency Markov Chain Monte Carlo (MCMC) processes on the rock physics models to generate low frequency models (LFMs) of rock properties;
d. train a deep neural network using the LFMs, the rock physics models, and the seismic angle stacks as training pairs of {log properties, seismic data} to generate a trained neural network;
e. provide a seismic dataset to the trained neural network to generate a high frequency rock property model;
f. perform broad-band MCMC processes on the high frequency rock property model to generate an ensemble of high frequency realizations of rock properties and
g. use the ensemble of high frequency realizations of rock properties to identify hydrocarbon deposits and recover hydrocarbons.

10. The non-transitory computer readable storage medium of claim 9 further comprising instructions that when executed by the one or more processors cause the device to quantify uncertainty in the ensemble of high frequency realizations of rock properties.

11. The non-transitory computer readable storage medium of claim 10 further comprising instructions that when executed by the one or more processors cause the device to generate a graphical representation of the uncertainty and display the graphical representation on a graphical display.

12. The non-transitory computer readable storage medium of claim 9 further comprising instructions that when executed by the one or more processors cause the device to generate a graphical representation of at least one of the ensemble of high frequency realizations of rock properties and display the graphical representation on a graphical display.

* * * * *